United States Patent Office 3,427,365
Patented Feb. 11, 1969

3,427,365
NITROSYL NICKEL COMPLEXES FOR OLEFIN DIMERIZATION
Perry L. Maxfield, Durango, Colo., assignor to Phillips Petroleum Company, a corporation of Delaware
No Drawing. Filed Dec. 12, 1966, Ser. No. 600,706
U.S. Cl. 260—683.15                9 Claims
Int. Cl. C07c 3/10; B01j 11/00

This invention relates to a new complex catalyst, and to the dimerization of olefins therewith.

In another aspect, the invention relates to a novel composition of matter comprising a nitrosyl nickel complex which is an effective catalyst for the dimerization of monoolefins.

In another aspect, the invention relates to a process for dimerizing monoolefins by contacting at least one monoolefin selected from cyclic and acyclic monoolefins with a nitrosyl nickel complex catalyst.

In a specific aspect, the invention relates to the dimerization of propylene by contacting the same with a catalyst obtained by admixing nitrosyl nickel halide with triphenylphosphine and ethylaluminum dichloride.

Dimerization of propylene and lower aliphatic monoolefins is of interest in the synthesis of monomers or intermediates for detergent feed and for upgrading automotive fuel constituents. It is an object of this invention to provide a novel, efficient process for dimerizing lower monoolefinic hydrocarbons. It is also an object of this invention to provide a novel composition of matter suitable as a catalyst in the dimerization of lower aliphatic monoolefins. It is a specific object of the invention to provide a novel catalyst and process for the dimerization of propylene.

Other aspects, objects, and the several advantages of the invention will be apparent to one skilled in the art from a reading of the disclosure and claims.

In accordance with the invention, a method is provided for dimerizing a monoolefin comprising contacting at least one monoolefin selected from cyclic and acyclic monoolefins with a catalyst formed by admixing:

(a) A nitrosyl nickel complex of the general formula (NO)Ni(L)B wherein L is a ligand selected from (1) $R_3Y$ wherein Y is selected from phosphorus, arsenic, and antimony, and R is selected from alkyl, cycloalkyl, and aryl radicals, and combinations thereof, (2) thiophene, and (3) alkyl-substituted thiophenes, and wherein B is selected from a halogen, and an anion formed by a halogen and a Lewis acid; and (b) An aluminum compound of the general formula $R'_xAlX_y$ wherein R' is selected from alkyl, cycloalkyl, and aryl radicals, and combinatons thereof, X is a halogen, $x$ and $y$ are integers the sum of which is 3, and neither $x$ nor $y$ is 0.

The process of this invention can best be effected by using the novel composition of matter comprising the product formed by admixing:

(a) A nitrosyl nickel complex of the general formula (NO)Ni(L)B wherein L is a ligand selected from (1) $R_3Y$ wherein Y is selected from phosphorus, arsenic, and antimony, and R is selected from alkyl, cycloalkyl, and aryl radicals, and combinations thereof, (2) thiophene, and (3) alkyl-substituted thiophenes, and wherein B is selected from a halogen, and an anion formed by a halogen and a Lewis acid; and (b) An aluminum compound of the general formula $R'_xAlX_y$ wherein R' is selected from alkyl, cycloalkyl, and aryl radicals, and combinations thereof X is a halogen, $x$ and $y$ are integers the sum of which is 3, and neither $x$ nor $y$ is 0.

Broadly, the process of this invention is applicable to the dimerization of cyclic and acyclic monoolefins, preferably having up to 12 carbon atoms per molecule or more. The olefinic bond can be terminal or internal, and the olefin can be branched or unbranched, but the branching is preferably no nearer the double bond that the 3-position. Some specific examples of suitable monoolefins are: ethylene, propylene, butene-1, butene-2, pentene-1, pentene-2, cyclopentene, cyclohexene, 3-methylbutene-1, cycloheptene, hexene-2, heptene-1, cyclooctene, 4,4-dimethyl-heptene-2, decene-1, dodecene-1, and the like, and mixtures thereof.

As mentioned above, the catalyst used in the process of this invention is a novel composition of matter formed by admixing certain nitrosyl nickel complexes with certain aluminum compounds. The nitrosyl nickel complex of this composition has the general formula (NO)Ni(L)B wherein L is a ligand selected from (1) $R_3Y$ wherein Y is selected from phosphorus, arsenic, and antimony, and R is selected from alkyl, cycloalkyl, and aryl radicals, and combinations thereof, (2) thiophene, and (3) alkyl-substituted thiophenes, and wherein B is selected from a halogen and an anion formed from the halogen and the Lewis acid. Preferably, the R substituents contain up to about 20 carbon atoms, but they can contain more. Further, the alkyl-substituted thiophenes preferably have no more than about three alkyl groups per thiophene molecule, and these groups preferably contain from 1 to 10 carbon atoms.

As mentioned above, B is selected from a halogen, including fluorine, chlorine, bromine, and iodine, and from anions formed from a halogen and a Lewis acid such as a halide of aluminum, boron, zinc, titanium, and tin. Examples of such complex anions are $AlCl_4^-$, $AlBr_4^-$, $AlI_4^-$, $ZnCl_3^-$, $BF_4^-$, $TiBr_5^-$, $SnCl_5^-$, and the like, and mixtures thereof.

The nitrosyl nickel complexes can be prepared by any conventional technique known in the art. For example, nitrosyl nickel chloride can be prepared by contacting nickel chloride with NO and zinc metal at temperatures of about 200° C. The resulting nitrosyl nickel chloride can then be contacted with an approximately equal molar quantity of triphenylphosphine in a suitable diluent to form the coordinate nitrosyl nickel chloride. The addition of Lewis acids such as aluminum trichloride, tin tetrachloride, and the like to these coordination compounds produce the embodiment containing the complex anion such as the $AlCl_4^-$, and $SnCl_5^-$.

Some examples of the nickel-containing component of the catalyst system are:

triphenylphosphine(nitrosyl)iodonickel
triphenylphosphine(nitrosyl)bromonickel
triphenylphosphine(nitrosyl)tetrabromoaluminato-
  nickel
triphenylarsine
(nitrosyl)iodonickel
tributylphosphine(nitrosyl)chloronickel
tridecylstibine(nitrosyl)bromonickel
trimethylarsine(nitrosyl)iodonickel
thiophene(nitrosyl)iodonickel
2,3,4-trimethylthiophene(nitrosyl)chloronickel
tricyclopentylphosphine(nitrosyl)chloronickel
tribenzylarsine(nitrosyl)iodonickel
tri-o-tolylphosphine(nitrosyl)tetrafluoroboratonickel and the like, and mixtures thereof. Some of the coordination compounds of this type can exist as dimers and trimers.

The second components of the catalyst system are organoaluminum compounds which are well-known in the art and are prepared by conventional methods. Some examples of the organoaluminum component of the catalyst system are:

ethylaluminum dichloride
diethylaluminum chloride
dimethylaluminum bromide
phenylaluminum dichloride
dioctylaluminum iodide
decylaluminum dibromide
dibenzylaluminum chloride
di(p-tolyl)aluminum iodide and the like, and mixtures thereof. Some of the above compounds are available in mixtures such as methylaluminum sesquichloride and ethylaluminum sesquichloride.

The above-described first and second catalysts components are generally combined, for use in this invention, in proportions in the range of from about 0.5:1 to about 20:1 mols of the aluminum component for each mol of the nickel component. An excess of the aluminum component is frequently desirable to scavenge catalyst poisons which might be in the system.

The catalyst is prepared by combining the first and second catalyst components under conditions of time and temperature which permit the catalytically active reaction mixture to be formed. This combination occurs very readily and, in general, the components can be mixed at any temperature within the range of —80 to about 100° C. for a few seconds or for periods of up to several hours in the presence of a diluent in which both the components are at least partially soluble. Any convenient diluent such as benzene, chlorobenzene, methylene chloride, ethylene chloride, tetrahydrofuran, and the like can be used for this purpose. Halogenated diluents are frequently preferred. The mixing of the two catalyst components is carried out in the substantial absence of air or moisture, generally in an inert atmosphere. After the catalytic reaction mixture is formed, it need not be isolated, but can be added directly to the reaction zone as a dispersion in its preparation diluent. If desired, the catalyst components can be separately added, in any order, to the reaction zone either in the presence or absence of the feed olefin.

According to the process of the invention, the olefin or mixture of olefins to be converted is contacted with the catalyst system at any convenient temperature within the broad range of —80 to about 150° C., preferably from about 0 to about 100° C. at any convenient pressure which is sufficient to maintain a liquid phase. It is frequently desirable, however, to carry out the reaction under some pressure, and pressures up to about 2,000 p.s.i.g., preferably 20–500 p.s.i.g., can be used. If desired, the conversion can be carried out in the presence of a diluent such as that used for the catalyst preparation. The time of contact will depend upon the desired degree of conversion but will, generally, be in the range of from about 0.1 minute to 20 hours, preferably 5–120 minutes. The proportion of catalyst composition to olefin feed in the reaction zone will generally be in the range of from about 0.001 to about 0.1 mol of nickel complex per mol of olefin feed.

Any conventional contacting technique can be utilized for the olefin dimerization, and batchwise or continuous operation can be utilized. After the reaction period, the products can be separated and/or isolated by conventional means such as by fractionation, crystallization, adsorption, and the like. Unconverted feed material or products not in the desired molecular weight range can be recycled.

If desired, the catalyst can be destroyed by treatment with water or alcohol prior to the separation of the products. In some cases, after separation of the olefins, the catalyst can be recycled to the reaction zone.

Although dimers are generally the predominating product, some higher oligomers are also formed with the process of this invention.

EXAMPLE 1

1.5 ml. of nitrosylnickel iodide dimer in tetrahydrofuran (about 1 millimole) and 0.23 g. triphenylphosphine were combined and the solvent removed by vacuum distillation leaving a dark violet residue. This was taken up in 10 ml. chlorobenzene and 0.75 ml. 44 wt. percent ethylaluminum dichloride in chlorobenzene was added. The final mixture was dark grey.

The catalyst was transferred to a polymerization flask on a heated shaker bath and propylene at 28 p.s.i. was introduced and this pressure was maintained during the reaction period. The reaction was allowed to proceed for 3½ hours at 35° C.

After venting and deactivation of the catalyst by the addition of water, 20 g. of liquid product was recovered. The product was analyzed by gas-liquid chromatography and proved to be a mixture of propylene dimers, mostly methylpentenes.

EXAMPLE II 0.20 g. triphenylphosphine(nitrosyl)bromonickel and 1.0 ml. weight percent ethylaluminum dichloride in chlorobenzene were used as catalyst in this run. The final mixture was a homogeneous deep blue solution. The catalyst was placed in the polymerization flask as in Example I and propylene at a pressure of 28 p.s.i. supplied. Initially the temperature was 30° C.; after 30 minutes this was increased to 75° C. and after 30 minutes reduced to 65° C. The reaction was continued for a total of 3½ hours.

The organic phase from the hydrolyzed reaction mixture weighed 60 g. and 53 g. of dimers were identified by gas-liquid chromatography. The remainder was higher liquid oligomers.

EXAMPLE III

A catalyst was prepared by a reaction of 5.0 g. $NiBr_2$ (anhyd.), 3.0 g. Ni powder, 13.0 g. triphenylphosphine, and 13.5 g. $AlBr_3$ which were dissolved in that order in 50 ml. chlorobenzene at 60–80° C. under a flow of NO gas at 0.04 l./min. for about 30 minutes. A deep blue solution formed indicating the formation of a complex. 1.5 ml. of this solution, containing triphenylphosphine(nitrosyl) bromonickel, and 1.0 ml. ethylaluminum dichloride were used as catalyst in this run to convert propylene, at 28 p.s.i., at 45° C. for 3 hours. 40 g. propylene dimers were obtained.

EXAMPLE IV

The catalyst used was the same as that in Example I, and the conditions, the same as in Example III. 20 g. of dimers were recovered as product. The catalyst was blue when the reaction was terminated, indicating that the reaction could have been continued.

The recovered dimer mixtures of Examples III and IV were hydrogenated to establish the product distribution; the hydrogenated product was analyzed by gas-liquid chromatography, with the following results:

HYDROGENATION PRODUCT

| | Example III, percent | Example IV, percent |
| --- | --- | --- |
| 2,3-dimethylbutane | 5 | 2 |
| 2-methylpentane | 70 | 65 |
| 3-methylpentane | 1 | 1 |
| n-Hexane | 24 | 31 |

In all of the runs some higher liquid propylene oligomers were found; however, it is significant that the product was primarily dimers of propylene, indicating that the catalytic admixture is selective for the formation of dimers.

Reasonable variation and modification are possible with-

I claim:

1. A process for dimerizing a monoolefin comprising contacting at least one monoolefin selected from acyclic and cyclic monoolefins with a catalyst formed by admixing:

(a) a complex of the general formula (NO)Ni(L)B wherein L is a ligand selected from (1) $R_3Y$ wherein Y is selected from phosphorus, arsenic, and antimony, and R is selected from alkyl, cycloalkyl, and aryl radicals, and combinations thereof, (2) thiophene, and (3) alkyl-substituted thiophenes, and wherein B is selected from a halogen, and an anion formed by a halogen and a Lewis acid; and (b) an aluminum compound of the general formula $R'_xAlX_y$ wherein R' is selected from alkyl, cycloalkyl, and aryl radicals, and combinations thereof, X is a halogen, x and y are integers the sum of which is 3, and neither x nor y is 0.

2. Process as defined in claim 1 wherein said Lewis acid is a halide of compounds selected from aluminum, boron, zinc, titanium, and tin, and wherein said halogen is selected from fluorine, bromine, chlorine, and iodine.

3. A process as defined in claim 2 wherein the temperature is within the range of from −80° C. to 150° C., and the pressure is no greater than about 2000 p.s.i.g.

4. A process as defined in claim 3 wherein said monoolefin is propylene, and said nitrosyl nickel complex is

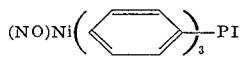

and said aluminum compound is ethylaluminum dichloride.

5. A process as defined in claim 2 wherein said monoolefin is propylene, and said nitrosyl nickel complex is

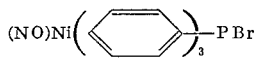

and said aluminum compound is ethylaluminum dichloride.

6. A composition of matter comprising the product obtained by admixing.

(a) a nitrosyl nickel complex of the general formula (NO)Ni(L)B wherein L is a ligand selected from (1) $R_3Y$ wherein Y is selected from phosphorus, arsenic, and antimony, and R is selected from alkyl, cycloalkyl, and aryl radicals, and combinations thereof, (2) thiophene, and (3) alkyl-substituted thiophenes, and wherein B is selected from a halogen, and an anion formed by a halogen and a Lewis acid; and (b) an aluminum compound of the general formula $R'_xAlX_y$ wherein R' is selected from alkyl, cycloalkyl, and aryl radicals, and combinations thereof, X is an halogen, x and y are integers the sum of which is 3, and neither x nor y is 0.

7. A composition of matter as defined in claim 6 wherein said complex is

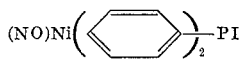

and said aluminum compound is ethylaluminum dichloride.

8. A composition of matter as defined in claim 6 wherein said complex is

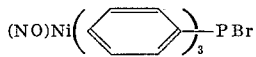

and said aluminum compound is ethylaluminum dichloride.

9. A composition of matter as defined in claim 6 wherein said Lewis acid is selected from halides of aluminum, boron, zinc, titanium, and tin, and said halogen is selected from fluorine, bromine, chlorine, and iodine.

References Cited

UNITED STATES PATENTS

| | | | |
|---|---|---|---|
| 2,969,408 | 1/1961 | Nowlin et al. | 260—683.15 |
| 3,306,948 | 2/1967 | Kealy | 260—680 |
| 3,327,015 | 6/1967 | Spitzer | 260—683.15 |
| 3,377,397 | 4/1968 | Maxfield | 260—683.15 X |

PAUL M. COUGHLAN, JR., *Primary Examiner.*

U.S. Cl. X.R.

252—429, 431; 260—429